United States Patent
Kametani (10) Patent No.: US 7,283,537 B2
(45) Date of Patent: Oct. 16, 2007

(54) NETWORK SYSTEM AND PACKET DATA TRANSMISSION METHOD

(75) Inventor: Jun Kametani, Tokyo (JP)

(73) Assignee: NEC Corporation, Tokyo (JP)

( * ) Notice: Subject to any disclaimer, the term of this patent is extended or adjusted under 35 U.S.C. 154(b) by 823 days.

(21) Appl. No.: 09/880,047

(22) Filed: Jun. 14, 2001

(65) Prior Publication Data

US 2002/0003803 A1   Jan. 10, 2002

(30) Foreign Application Priority Data

Jun. 15, 2000   (JP)   ............................. 2000-180174

(51) Int. Cl.
*H04L 12/28* (2006.01)
*H04J 3/16* (2006.01)

(52) U.S. Cl. ...................... 370/401; 370/466

(58) Field of Classification Search ............... 370/354, 370/355, 475, 466, 401; 379/114.01, 114.28
See application file for complete search history.

(56) References Cited

U.S. PATENT DOCUMENTS

| | | | | |
|---|---|---|---|---|
| 5,946,634 | A * | 8/1999 | Korpela | 455/552.1 |
| 5,991,299 | A * | 11/1999 | Radogna et al. | 370/392 |
| 6,104,704 | A * | 8/2000 | Buhler et al. | 370/252 |
| 6,118,784 | A * | 9/2000 | Tsuchiya et al. | 370/401 |
| 6,151,628 | A * | 11/2000 | Xu et al. | 709/225 |
| 6,233,234 | B1 * | 5/2001 | Curry et al. | 370/356 |
| 6,272,126 | B1 * | 8/2001 | Strauss et al. | 370/352 |
| 6,404,746 | B1 * | 6/2002 | Cave et al. | 370/262 |
| 6,470,008 | B1 * | 10/2002 | Khuc | 370/352 |
| 6,570,870 | B1 * | 5/2003 | Berstis | 370/352 |
| 6,633,571 | B1 * | 10/2003 | Sakamoto et al. | 370/401 |
| 6,636,505 | B1 * | 10/2003 | Wang et al. | 370/352 |
| 6,650,631 | B1 * | 11/2003 | Benash et al. | 370/352 |
| 6,665,293 | B2 * | 12/2003 | Thornton et al. | 370/352 |
| 6,680,907 | B1 * | 1/2004 | Bonaventure | 370/229 |
| 6,701,437 | B1 * | 3/2004 | Hoke et al. | 713/201 |
| 6,760,775 | B1 * | 7/2004 | Anerousis et al. | 709/238 |
| 6,775,267 | B1 * | 8/2004 | Kung et al. | 370/352 |
| 6,778,494 | B1 * | 8/2004 | Mauger | 370/230 |
| 6,791,974 | B1 * | 9/2004 | Greenberg | 370/352 |

FOREIGN PATENT DOCUMENTS

| | | |
|---|---|---|
| JP | H11-341040 A | 12/1999 |
| JP | 2000-115247 A | 4/2000 |

* cited by examiner

*Primary Examiner*—Andrew C. Lee
(74) *Attorney, Agent, or Firm*—Sughrue Mion Pllc.

(57) ABSTRACT

A user terminal is connected to an IP network through an access gateway, and service provider networks are connected to the IP network through an exchange router and border gateways. A group of servers store, for example, information about users, information about services, information about connection, and account information, and, in addition, perform user accounting and alternative account billing to the users. The exchange router converts a packet from the user terminal to the protocol/format on the service provider side and converts a packet from the service provider side to the protocol/format of the user terminal. By virtue of this construction, a network system and a packet data transmission method can be realized which unify connection between users and a plurality of service providers and unified management of business routine and accounting.

24 Claims, 7 Drawing Sheets

NETWORK SYSTEM AND PACKET DATA TRANSMISSION METHOD

FIELD OF THE INVENTION

The invention relates to a network system and a packet data transmission method, and more particularly to a network system and a packet data transmission method which, even in the case where packet data is transmitted from a user terminal to a network to perform the receipt of orders for products or the like, ordering of products or the like, or the settlement thereof between the user terminal and a plurality of service providers or the like, can realize the unification of connection between the user terminal and the plurality of service providers, and the unified management of business routine and accounting.

BACKGROUND OF THE INVENTION

Network systems utilizing various VPN (virtual private network) techniques are known as systems which can realize, for example, the receipt of orders/ordering of products, materials and the like and the settlement through the transmission of IP (internet protocol) packet data over networks.

Figure 5:
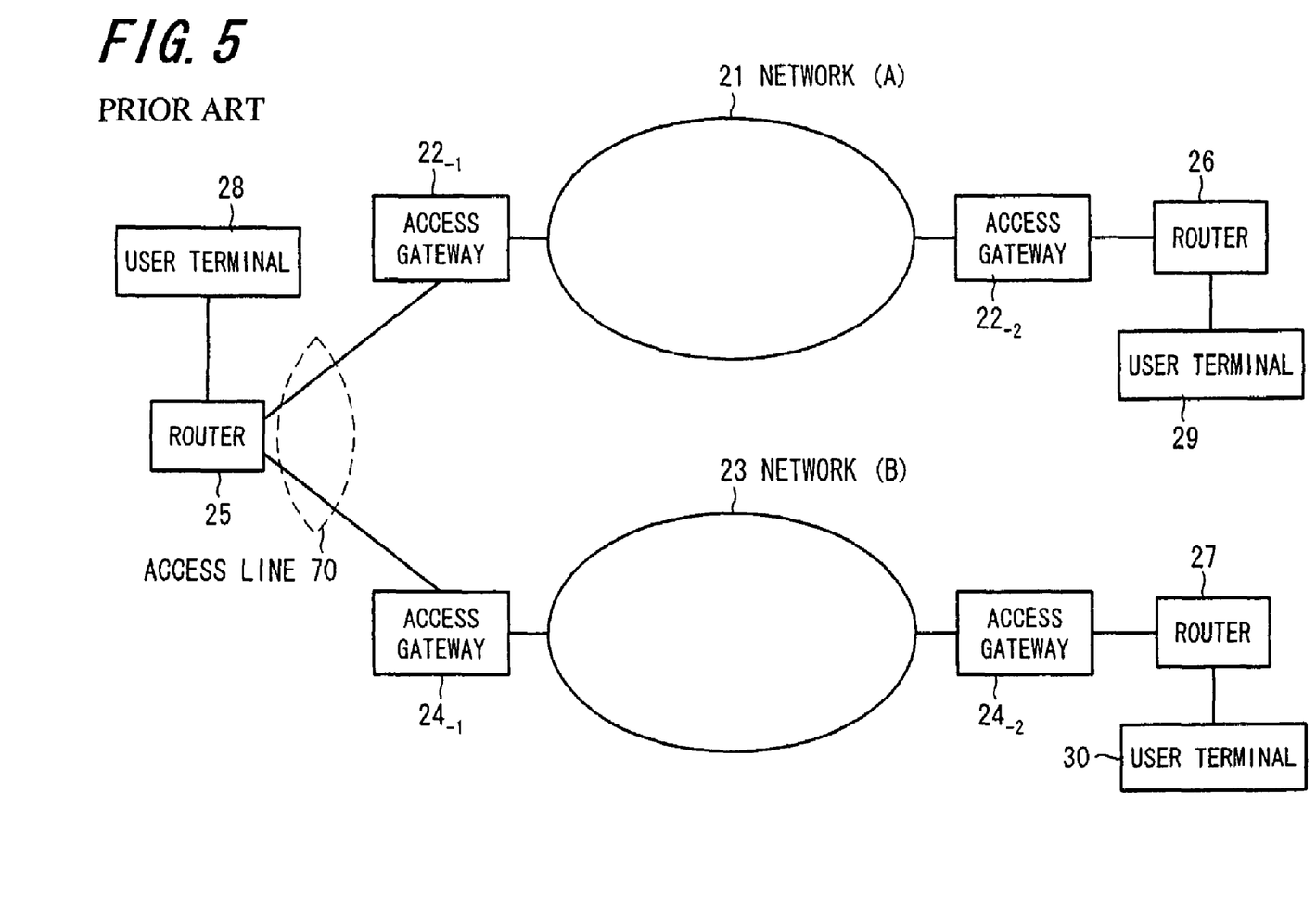
FIG. 5 is a connection diagram showing a conventional network system using a VPN technique.

FIG. 5 shows a conventional network system using a VPN technique.

A plurality of access gateways 22-1 and 22-2 are connected to a network (A) 21, and a plurality of access gateways 24-1 and 24-2 are connected to a network (B) 23. A router 25 is connected to the access gateways 22-1 and 24-1, a router 26 is connected to the access gateway 22-2, and a router 27 is connected to the access gateway 24-2. User terminals 26, 29, 30 are connected respectively to the routers 25, 26, 27. The networks (A, B) 21, 23 are networks of network service providers, or service providers. Here the number of networks is two. However, the number of networks may be any one. Likewise, although two access gateways are used for each one network, the number of access gateways per network may be any one.

An explanation will be given, for example, in the case where the user of a user terminal 28 sends data to a user terminal 29. Information sent from the user terminal 28 is introduced into the router 25. The router 25 decides a network, through which the information from the user terminal 28 should be sent, based on destination data (destination address) contained in the received information. Here the network (A) 21 is selected, and the router 25 transfers the information from the user terminal 28 to the access gateway 22-1. The access gateway 22-1 gives the information from the user terminal 28 on the network 21. As soon as the information transmitted over the network 21 reaches the access gateway 22-2, the access gateway 22-2, upon the detection of the presence of destination data as a passage object, transfers this information through the router 26 to the user terminal 29.

The system should be constructed so that information sent from each user terminal to the network 21 or 23, even when transferred to a third party, cannot be decoded. For example, in the case of an internet VPN system, in sending information from a user terminal to a network through a collection of ISPs (Internet service providers), the information is encrypted by firewall for security purposes. Since, however, the networks are a collection of ISPS, it is impossible to verify the network in which an accident has occurred. This renders the responsibility for the security unclear, and, for example, if there has been information leakage, the sender per se is responsible for the information leakage.

On the other hand, in the construction shown in FIG. 5, since a CUG (closed user group) service managed, for example, by a communication company or a service company is used, the responsibility for security, accident and the like is clear. The reason for this is that, since communication is carried out through a single IP network (a network 21 or 23) rather than a collection of ISPs, the status of transmission can be grasped by each IP network. In the CUG service system, information is transmitted using IP within IP or MPLS (multi-protocol label switching protocol) as the VPN technique, and, thus, the firewall is not generally required.

Figure 6A:
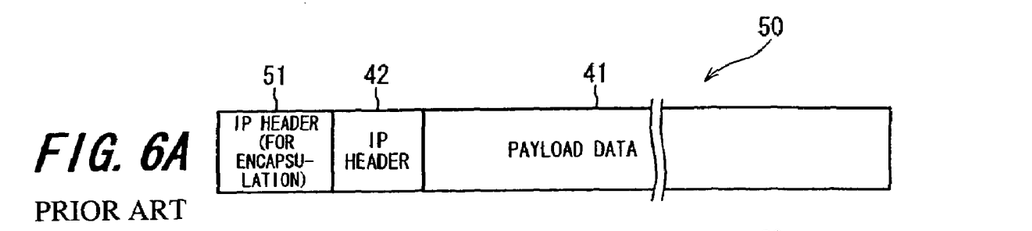
FIGS. 6(a) to 6(c) is a construction diagram showing an embodiment of the format of IP packets of IP within IP and MPLS.
Figure 6B:
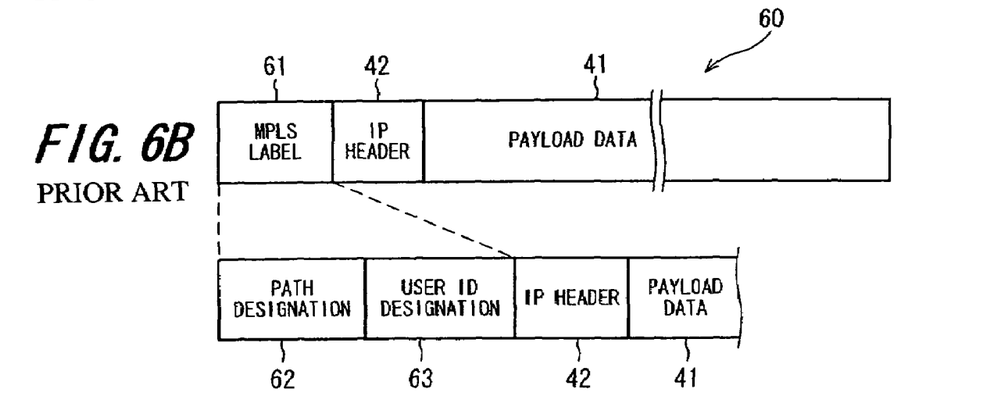
Figure 6C:
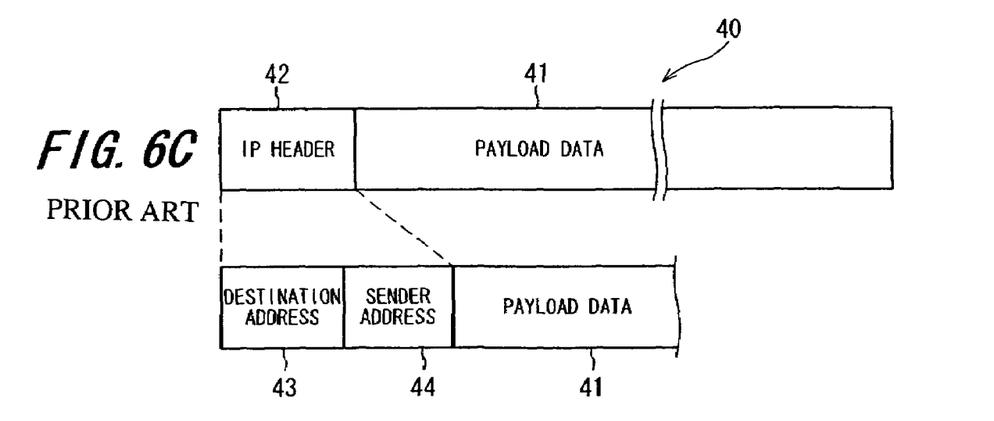

FIG. 6 shows an example of the format of an IP packet of IP within IP and MPLS.

As shown in FIG. 6C, an original IP packet 40 comprises payload data 41 as a data portion and an IP header 42 as control information added to the head of the payload data 41. The IP header 42 comprises, for example, a destination address 43 and a sender address 44.

An IP packet 50 by the IP within IP system shown in FIG. 6A comprises this IP packet 40 and, added to the head of the IP packet 40, an IP header 42 and a capsule IP header 51 indicating the address of a router, to which the sender is connected, and the address of a router to which the send destination is connected. On the other hand, an IP packet 60 by the MPLS system comprises the payload data 41 and, added to the head of the payload data 41, an IP header 42 and an MPLS label 61. This MPLS label 61 comprises an MPLS label 62 for path designation and an MPLS label 63 for user designation.

Figure 1:
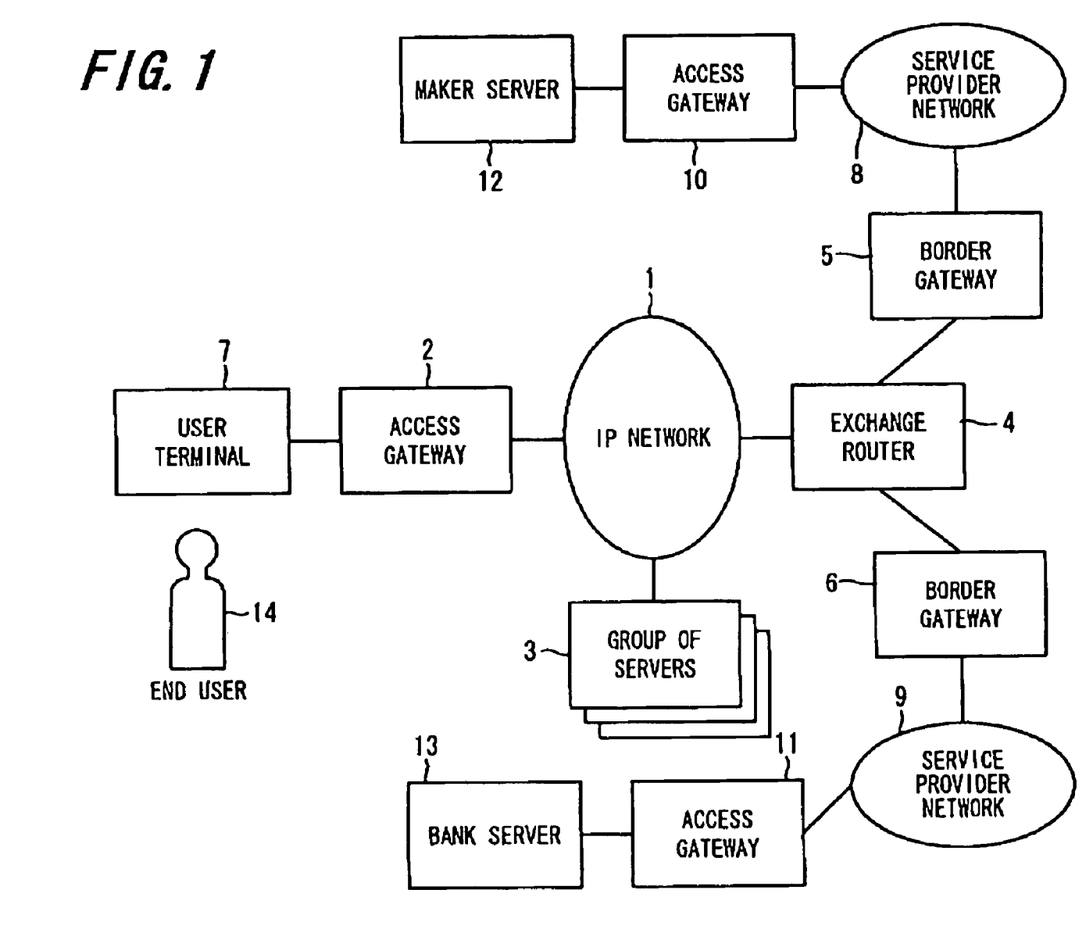
FIG. 1 is a connection diagram showing a network system according to the invention.

FIG. 1 shows an example of data transmission by IP within IP and MPLS shown in FIG. 6. In this example, seven routers are provided.

Figure 7:
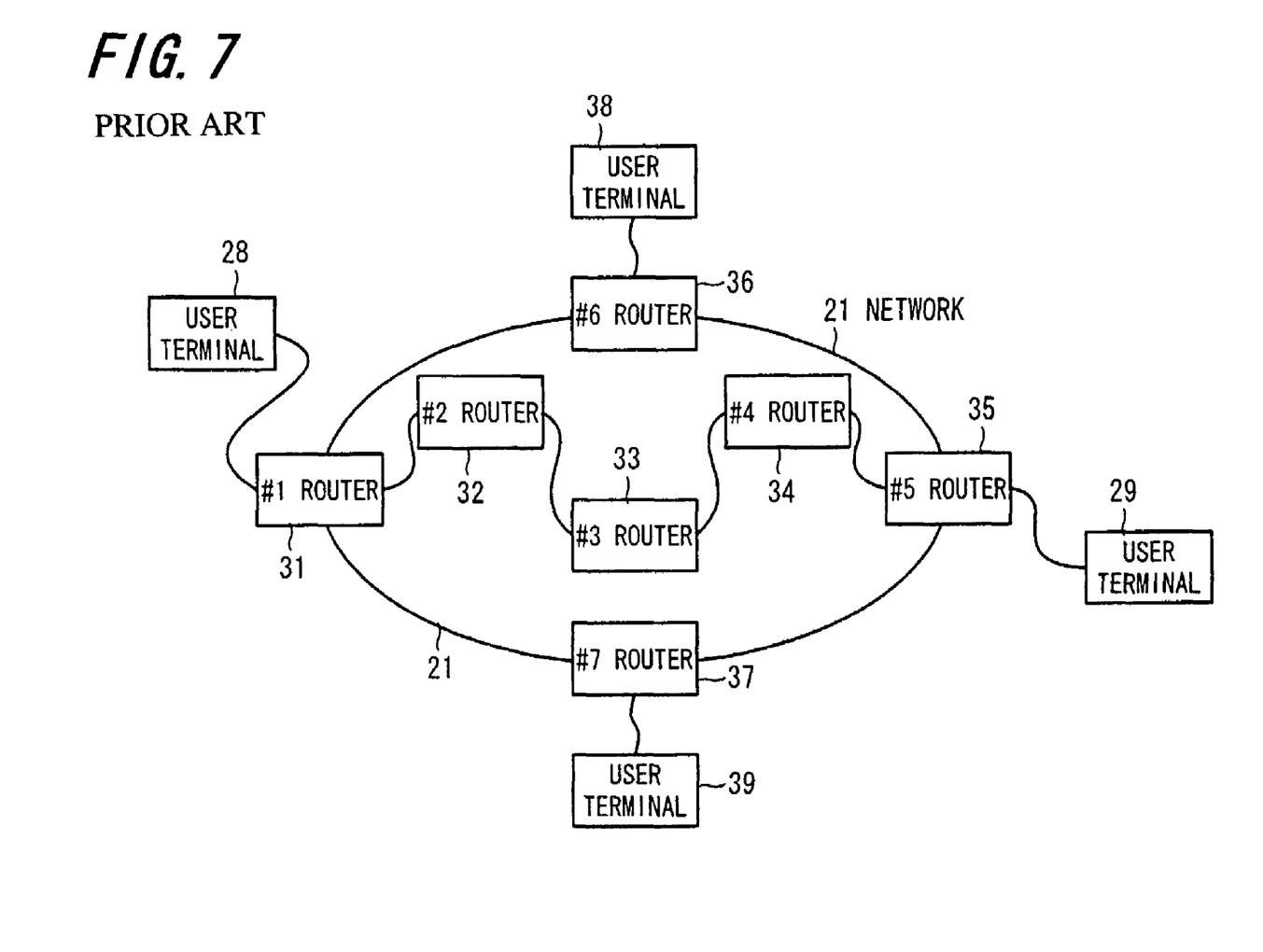
FIG. 7 is a diagram illustrating an embodiment of data transmission of IP within IP and MPLS shown in FIG. 6.

Seven routers #1 31 to #7 37 are connected directly or indirectly over a network 21. A user terminal 28 is connected to the router #1 31, a user terminal 29 to the router #5 35, a user terminal 38 to the router #6 36, and a user terminal 39 to the router #7 37.

Here when data is transmitted from the user terminal 28 to the user terminal 29, send data is passed through a path router #1 31→router #2 32→router #3 33→router #4 34→router #5 35 in this order.

When IP within IP is used, information, indicating that the sender is the user terminal 28, is stored in the sender address 44 in the IP header 42 shown in FIG. 6A, information, indicating that the destination is the user terminal 29, is stored in the destination address 43. In the capsule IP header 51, information, indicating that the sender is the router #1, is stored in the sender address, and information, indicating that the destination is router #5, is stored in the destination address. Thus, in IP within IP, the IP packet is encapsulated with the IP header 51. As a result, even though the user of the user terminal 39, who has learned the sender address 44 of the user terminal 28, attempts to perform transmission under the pretense of the user of the user terminal 28, the send data is not transmitted from the user terminal 39 because the address information at the IP header 51 is different. This can ensure a high level of security.

On the other hand, when MPLS is used, in FIG. 6B, information, indicating that the sender is the user terminal 28, is stored in the sender address 44 in the IP head 42, and information, indicating that the destination is the user terminal 29, is stored in the designation address 43. Further, information, indicating that which path is to be selected for each transit point over the whole path router #1 31→router #2 32→ . . . , is stored in the MPLS label 62 in the MPLS label 61, and information indicating user information of the sender is stored in the MPLS label 63. In this MPLS, the delay is constant because the transfer path is constant. Therefore, in the transmission of voice data or the like, for example, no pitch variation takes place in the voice, and, thus, advantageously, the voice can be easily understood.

In the conventional network system, however, when the number of access lines 70 shown in FIG. 5 is increased, the number of cases, where the protocol of the network as the connection destination is not common, is increased. This leads to the presence of IP within IP together with MPLS, and requires any protocol conversion processing. Therefore, the construction of the system is complicated. When the management entrepreneur is different for each network, the user should contract with each entrepreneur (such as a service provider). This imposes the following burdens on the user.

(1) A bill for charge for is sent from each service provider to the user, and this is troublesome for the user.

(2) The user should contract with each of a plurality of service providers. Therefore, business routine, such as entry procedure, is increased and becomes complicate.

(3) When the plurality of service providers are different in protocol, for example, the lead-in of a plurality of access lines is necessary and this incurs extra equipment cost and communication cost.

For end users, preferably, a wide variety of services including media delivery services and electronic commerce can be received on one network infrastructure. In the current status of progress of VPN service, however, intensifying all the services on one framework is unrealistic, and poses the above problems.

SUMMARY OF THE INVENTION

Accordingly, it is an object of the invention to provide a network system and a packet data transmission method which can realize the unification of connection between a user terminal and a plurality of service providers and the unified management of business routine and accounting.

According to the first feature of the invention, there is provided a network system wherein an IP packet according to a service requested by a terminal is sent to a service provider through a plurality of IP networks different from each other in protocol and the service is supplied to the terminal through the utilization of an IP packet transmitted from the service provider to the plurality of IP networks, said network system comprising packet exchange means that is provided between the plurality of IP networks and functions to convert the format of the IP packet, to be sent, so as to match the format of the IP network as a send destination.

According to this system, packet exchange means is provided so that, in a plurality of IP networks, when an IP packet is sent from a first IP network to a second IP network, the format of the IP packet to be sent from the first IP network to the second IP network is converted to the format of the second IP network, while when the send direction of the IP packet is opposite, the format of the IP packet is converted to the format of the first IP network. By virtue of this construction, even when IP networks different from each other in transmission form are present together, data transmission and data exchange can be carried out without any trouble. Further, the network can be easily expanded or unified.

According to the second feature of the invention, there is provided a network system comprising:

a user terminal to be utilized by a user;

a plurality of networks of service providers or online entrepreneurs which provide various services to the user;

an IP network which performs the transmission of packet data between the user terminal and the plurality of networks through a router according to an IP address; and servers connected to the IP network, said servers functioning to record information about the user, information about the plurality of service providers or online entrepreneurs, and information about services provided from the side of the plurality of networks to the user, and, based on the record, to unitarily manage account information of the service provided to the user, and to perform alternative account billing from the service providers or online entrepreneurs to the user.

According to this system, based on information recorded in the servers, the servers unitarily manage account information required in services to users and, in addition. execute alternative account billing to the users. Therefore, the window of the entry into and withdrawal from a plurality of service providers or online entrepreneurs, billing of charge, and payment of charge is unified. This can simplify business routine and transaction and can reduce transaction cost on the user side. Further, since connection between a plurality of service providers or online entrepreneurs and users is performed through only an IP network, the line can be unified and, in addition, connection to service providers can be facilitated.

According to the third feature of the invention, there is provided a network system comprising:

an IP network through which an IP packet is transmitted;

an access gateway connected to the IP network;

a user terminal which is installed on a user side and is connected to the access gateway;

servers which are connected to the IP network and function to record information about the user and the plurality of service providers or online entrepreneurs, and information about services provided from the plurality of service providers or online entrepreneurs to the user, and, based on the record, to unitarily manage account information of the service provided to the user;

a packet exchange which is connected to the IP network, converts received packet data to the format and protocol of the network of a service provider or an online entrepreneur as a send destination, and sends the converted packet data; and a plurality of border gateways which connect the packet exchange to the plurality of networks of the service providers or online entrepreneurs.

According to this system, servers manage, for example, information about services and other information, which users desire, and account information, and alternative account billing from a plurality of service providers or online entrepreneurs is performed. For packet data from the user terminal, the packet exchange converts packet data to the format and protocol of the send destination network and transfers the converted packet data. On the other hand, for packet data from the service provider or online entrepreneur, the packet exchange converts the packet data to the format and protocol of the user terminal and then transfers the converted packet data to the user terminal. Since access from users to various services, accounting, and alternative execution of account billing can be unitarily managed by servers, the window of the entry into and withdrawal from various services. billing of charge, and payment of charge is unified.

This can simplify business routine and transaction and can reduce transaction cost on the user side. Further, since the packet exchange is connected to a plurality of networks through border gateways, connection between a plurality of service providers or online entrepreneurs and users is performed through only an IP network, the line can be unified. This can facilitate the connection of the user to the service providers or online entrepreneurs.

According to the fourth feature of the invention, there is provided a packet data transmission method wherein packet data transmission for receive/send of services between a user terminal and a plurality of service providers or online entrepreneurs is carried out using VPN (virtual private network), said packet data transmission method comprising the steps of:

recording, in servers, information about users, who utilize the user terminal, and the plurality of service providers or online entrepreneurs;

upon the receipt of a request from the user for a service, only when information about packet data from the user terminal matches access conditions recorded in the servers, converting the packet data from the user to the protocol and format of the network of a service provider or an online entrepreneur as a send destination by a packet exchange, and sending the converted packet data to a network corresponding to the designated one of the plurality of service providers or online entrepreneurs;

for packet data from the plurality of service providers or online entrepreneurs, converting the packet data to the protocol and format of the network on the user terminal side by the packet exchange, and sending the converted packet data to the user terminal; and storing and managing account information about the services to the user and executing alternative account billing to the user by the servers.

According to this method, upon access from a user to any one of service providers or online entrepreneurs, when information about packet data from the user matches access conditions recorded in servers, the access is judged to be an authorized request and the packet data is transferred to the packet exchange. This packet exchange converts the packet data from the user to packet data of protocol and format of the service provider or online entrepreneur as the send destination, and this converted packet data is then transferred to the send destination. On the other hand, for packet data from a plurality of service providers or online entrepreneurs, the packet exchange converts the packet data to the protocol and format of the user terminal and then sends the converted packet data to the user terminal. The servers compute and record account information required in the requested service to the user and, in addition, perform accounting and alternative account billing. Thus, access from users to various services can be unitarily managed by servers, and, thus, the window of the entry into and withdrawal from various services, billing of charge, payment of charge and the like is unified. This can simplify business routine and transaction and can reduce transaction cost on the user side.

BRIEF DESCRIPTION THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

First Preferred Embodiment

FIG. 1 shows a network system according to the invention.

An access gateway 2, a group of servers 3 provided with a plurality of servers (for each application or each processing object), and an exchange router 4 as a packet exchange are connected to an IP network 1. These apparatuses are managed by a network service provider (for example, a wide-area telephone company).

Border gateways 5, 6 are connected to the exchange router 4, and a user terminal 7, which the end user utilizes, is connected to the access gateway 2. Service provider networks 8, 9, which provide services to the end user and perform data transmission through IP protocol, are connected respectively to the border gateways 5, 6. Access gateways 10, 11 are connected respectively to the networks 8, 9, and a maker server 12 installed in a maker and a bank server 13 installed in a bank are connected respectively to the access gateway 10 and the access gateway 11. In this embodiment, for convenience of explanation, two service provider networks (networks 8, 9) are provided, and the number of servers connected to these respective networks are also two, a maker server and a bank server. In fact, however, a larger number of service providers and a wider variety of entrepreneur terminals are connected. Further, in fact, a large number of terminals are connected to each of the maker server 12 and the bank server 13. Here, however, these terminals are not shown.

The IP network 1 is a network for transmitting packet data, and is managed, for example, by a sole entrepreneur, such as a telephone company having a wide service area, and the management of the IP network 1 is carried out using a group of servers 3. The access gateway 2 is provided at a connection between the user terminal 7 and the IP network 1, and receives a line from the user terminal 7. The user terminal 7 is utilized by an end user 14, for example, in an enterprise (a plurality of individual users such as staffs and employees of the enterprise). For example, a router is used in the user terminal 7.

The group of servers 3 include a server for distinguishing and managing address/protocol type of service providers, that provide services which end users desire, for each user group (such as individual/section/business points), a server for managing services and related information, and a server for managing account information according to the contents of service utilized by the end users 14. The group of servers 3 unitarily manage, for example, the contents of services, which the end users desire, access list, and account information.

The exchange router 4 as packet exchange means or packet exchange functions to convert a protocol used in the networks 8 9 (IP within IP or MPLS) to a protocol used in the IP network 1 and, further, to convert the protocol used in the IP network 1 to a protocol used in the networks 8, 9. The packet data after the conversion is transferred from the exchange router 4 to the border gateways (5, 6) or the IP network 1.

Figure 2:
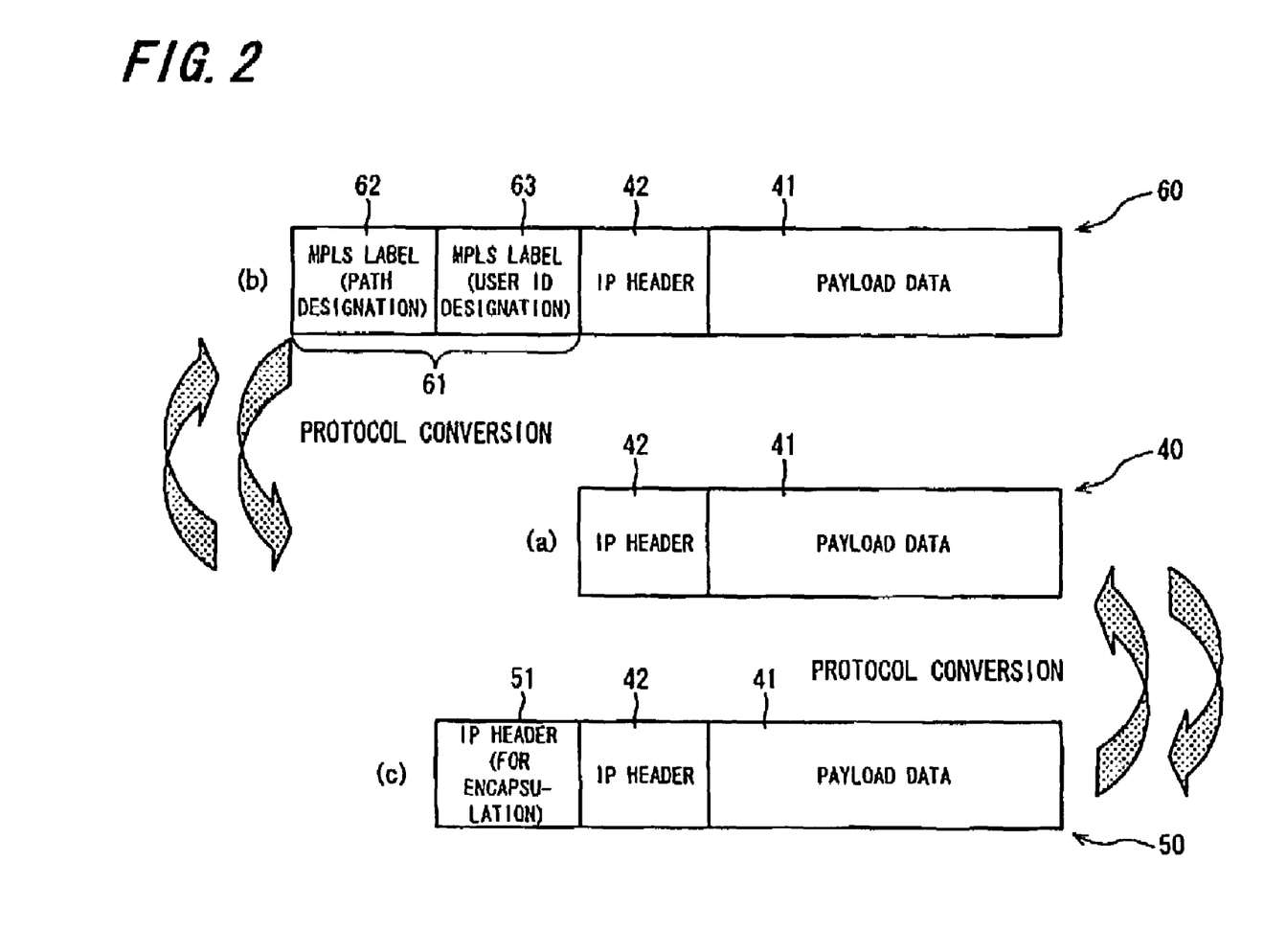
FIG. 2 is a diagram illustrating an embodiment of format/protocol conversion of an IP packet performed in an exchange router shown in FIG. 1.

FIG. 2 shows an embodiment of format/protocol conversion of IP packets by the exchange router 4. Here the IP headers 42, 51, the MPLS labels 62, 63 and the like are explained in conjunction with FIG. 6, and, thus, the explanation thereof will be omitted.

In FIG. 2, (a) shows an original IP packet 40 sent from (or received by) the terminal 7 of the end user 14, and comprises a payload data 41 and an IP header 42. In FIG. 2, (b) shows an IP packet 60 prepared by encapsulating the IP packet 40, shown in (a), with an MPLS protocol, and comprises MPLS label 61+IP header 42+payload data 41. In FIG. 2, (c) shows an IP packet 50 prepared by encapsulating the IP packet 40 shown in (a) by the IP within IP technique, and comprises encapsulation IP header 51+IP header 42+payload data 41.

The exchange router 4 converts the packet received from the end user to a format (b) or a format (c) shown in FIG. 2 according to the type of the VPN platform in the send destination, and inversely converts the packet of the encapsulated format (b) or (c) received from the VPN side to the format (a) which the end user can interpret.

Further, the exchange router 4 has the function of processing the protocol conversion in the network layer according to a request from the end user for service access and the function of measuring the amount of transfer information (for example, number of packets/number of bytes) of the packets after the protocol conversion. This makes it possible to perform format/protocol conversion of packet data between end users and various service providers in cooperation with the group of servers 3.

Figure 3:
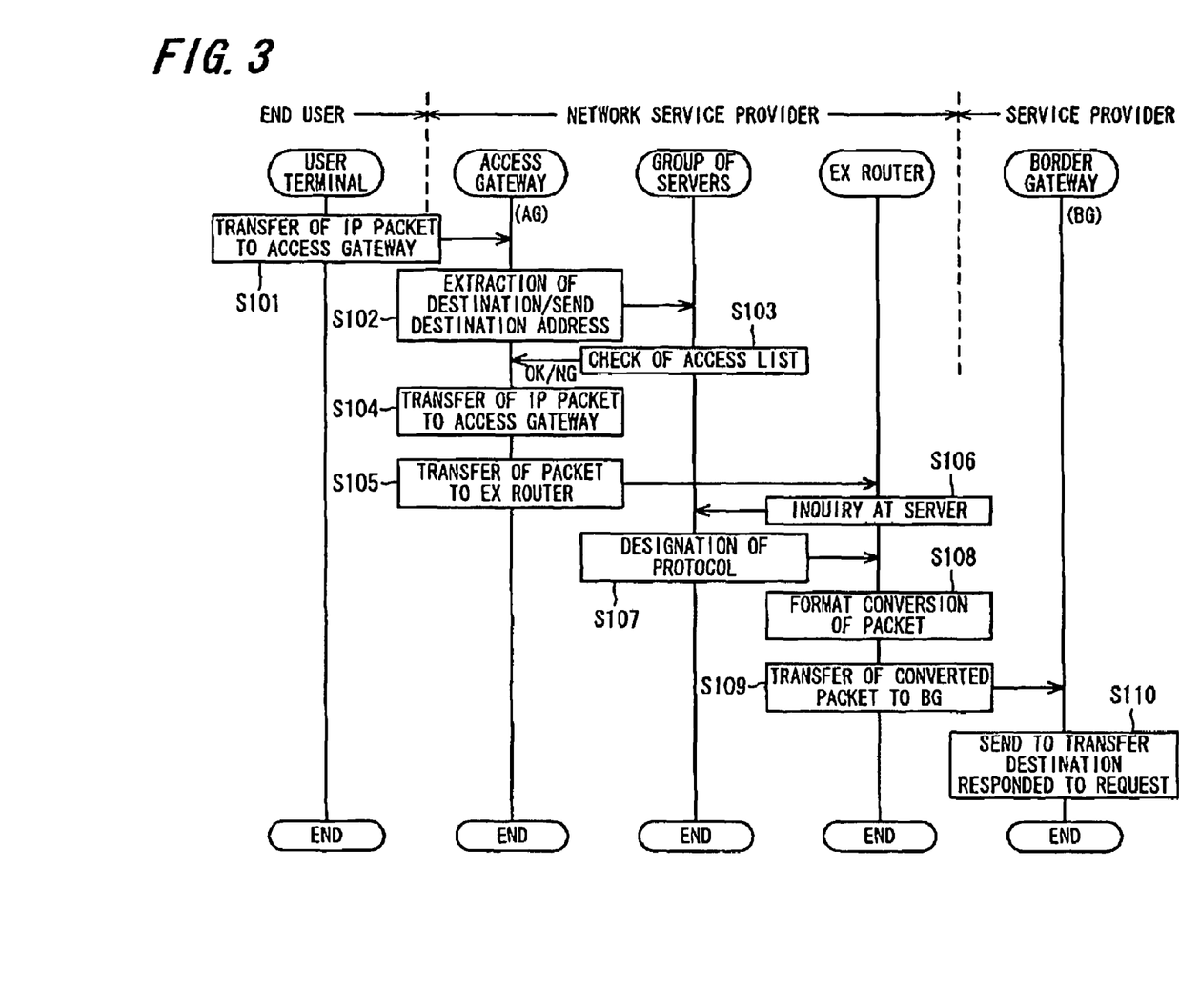
FIG. 3 is a time sequence showing the operation of transmission of packet data from a user terminal to a service provider side.
Figure 4:
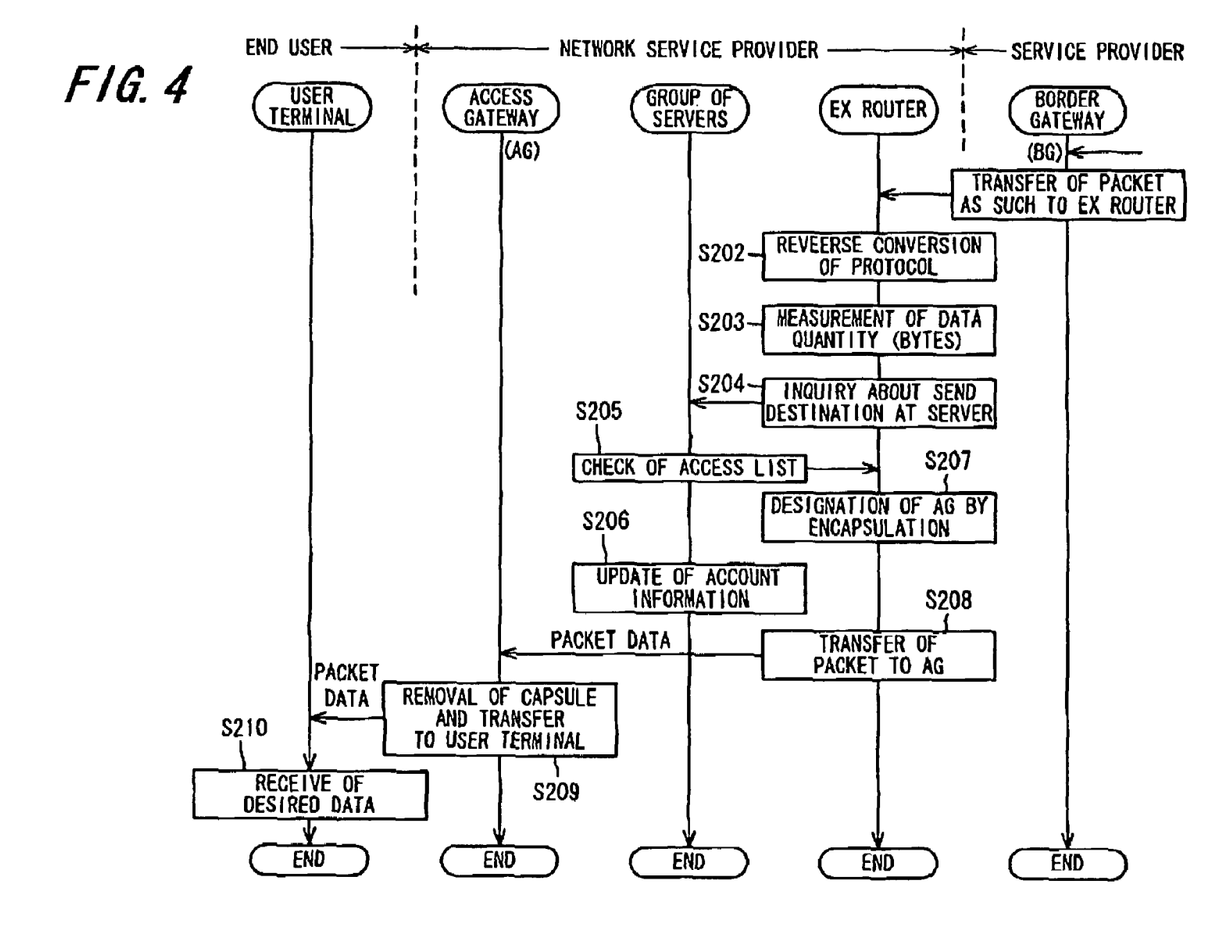
FIG. 4 is a time sequence showing the operation of transmission of packet data from a service provider side to a user terminal.

FIGS. 3 and 4 show the packet data transmission method and the processing of the network system according to the invention. In the drawings, S represents a step.

Next, the operation of the network system having the above construction according to the invention will be explained in conjunction with FIGS. 1 to 4.

For example, an enterprise as the end user accesses the IP network 1 through the user terminal 7 and the access gateway 2. The end user 14 contracts with individual service providers for the provision of services through network service providers according to the type of distribution of information involved, for example, in business corporations activities. The platform of VPN actually utilized is generally different according to the line of business. For example, the estimate of products, the receipt of orders for products, the ordering of products and the like are performed through the service provider network 8, and the settlement of the payment for buying and selling is performed through the service provider network 9.

In making an application for a network service to the network service provider, the end user states, to the network service provider, information identifiable by individual users. such as an IP network address in the section which utilizes the service. The network service provider binds and catalogs this identification information, type of service, VPN platform used and other information into the group of servers 3. After this cataloging is once carried out, upon the send of a request from the individual user for a desired service through the user terminal 7 to the access gateway 2, the access gateway 2 interprets the demand of the individual user, and sends the results to the IP network 1.

At the outset, the send of packet data from the user terminal 7 to the maker server 12 through the service provider, which manages the network 8, will be explained in conjunction with FIG. 3.

The packet data from the user terminal 7 is sent to the access gateway 2 (S101). The access gateway 2 extracts information, such as IP destination address, IP sender address, and destination port number, from the received IP packet, and makes an inquiry to the group of servers 3 (S102). Upon the receipt of the inquiry, the group of servers 3 check whether or not the contents of the inquiry match the cataloged access conditions (S103). As a result of the verification by the group of servers 3, when the contents of the inquiry have been found not to match the cataloged access conditions, the request for access is judged to be unauthorized access and, in this case, the access gateway 2 discards this IP packet. On the other hand, when the contents of the inquiry have been found to match the cataloged access conditions, the IP packet is encapsulated to designate that the destination is the exchange router 4 (S104), followed by transfer of the IP packet to the exchange router 4 (S105). In the encapsulation in S104, an IP header necessary for permitting passage through the IP network 1 is added to the packet data sent from the user terminal 7. The IP header has the sender address of the access gateway 2 and the destination address which indicates the exchange router 4.

The exchange router 4 makes an inquiry about the type of protocol to the group of servers 3 (S106). Upon the receipt of this inquiry, the group of servers 3 designate a protocol and inform the exchange router 4 of the protocol (S107). The exchange router 4 performs conversion of the packet to the designated protocol (protocol/format shown in (b) or (c) in FIG. 2) (S108). After the conversion, the IP packet is transferred to the border gateway 5 designated by the exchange router 4 (S109). In order to send the converted IP packet to the designated maker server 12, the border gateway 5 sends the converted IP packet to the network 8 (S110). The IP packet on the network 8 is received by the access gateway 10, and is transferred to the maker server 12 as the send destination.

Next, the send of packet data from the service provider is side to the user terminal 7 will be explained in conjunction with FIG. 4.

For example, it is assumed that the IP packet is sent from the bank server 13 and arrives at the border gateway 6 through the access gateway 11 and the network 9. The border gateway 6 transfers the received IP packet as such to the exchange router 4 (S201). The exchange router 4 executes inverse conversion, in which the protocol is converted to a protocol used in the IP network 1 (S202), and further measures the amount of data (for example, number of bytes) of the received IP packet (S203). Next, the exchange router 4 inquires about the send destination of the inversely converted IP packet to the group of servers 3 (S204). At that time, user information, together with account information, is sent from the exchange router 4 to the group of servers 3. The group of servers 3 record the account information for each user. Upon the receipt of the inquiry from the exchange router 4, the group of servers 3 check the access list (S205), return the address of the access gateway 2, through which information for the user terminal 7 as the send destination is passed, to the exchange router 4, and further updates the account information (S206). The group of servers 3 check the information against account information separately sent from the service provider to execute the accounting of the end user.

On the other hand, based on the address reported from the group of servers 3, the exchange router 4 executes encapsulation of the IP packet (S207). Specifically, an IP header is added to the head of the packet data sent from the border gateway 6 to designate the send of the packet through the IP network 1 to the access gateway 2, and, in order to send the IP packet to the access gateway 2, the exchange router 4 sends the IP packet to the IP network 1 (S208). The access gateway 2 removes the IP header (capsule) added at the time of the encapsulation in the exchange router 4 to return the packet to packet data, as-sent from the border gateway 6, which is then transferred to the user terminal 7 (S209). This packet data is received by the user terminal 7 (S210).

Thus, the network service provider, which provides the IP network 1, the access gateway 2, the group of servers 3, and the exchange router 4, performs the provision of access line and access means to the end user, and executes contract between the end user and the service providers and alternative accounting and collection of bills regarding the service for each user, whereby the network service provider collects line charge and additional service charge from the end user and collects agency fee from the service provider.

According to this preferred embodiment of the invention, access line to the end user can be unified to only a line from the network service provider. Therefore, this can eliminate the need for the end user to pay extra communication cost (for example, line laying fee and line charge) for the utilization of various network services.

Further, since the access from the end user to various services is unitarily managed by the group of servers 3, the window of the entry into and withdrawal from various services, billing of charge, and payment of charge is unified. This can reduce cost necessary for the transaction of business on the end user side.

Further, the service providers can outsource the provision of access line and the customer dealing work to the network service provider. Therefore, the cost for acquiring the subscriber of service can be reduced, and can easily expand the service area coverage.

In the above preferred embodiment, a specialty network for entrepreneurs may be connected instead of the service provider network. For example, a construction may be adopted such that an online network of a bank as an online entrepreneur is connected instead of the networks 8, 9 shown in FIG. 1 and is managed by the group of servers 30. This can realize unified management of various procedures of a plurality of banks and thus can eliminate troublesome settlement of bills bank by bank.

Second Preferred Embodiment

The second preferred embodiment of the invention will be explained.

In the first preferred embodiment, the end user is a collection of a plurality of users, for example, in an enterprise. On the other hand, in this second preferred embodiment, a packet data conversion service is provided to individuals as the end user.

In this case, the user terminal 7 shown in FIG. 1 is constituted by PC (a personal computers, a specialty terminal, or a portable terminal having the function of processing packet data (for example, a portable telephone (cellular phone) having an i mode function, or PHS), and the access gateway 2 is constituted, for example, by a remote access server. In this connection, it should be noted that the group of servers 3 should additionally have the function of managing authentication data (for example, user ID/password) for the authentication of individuals and a user authentication protocol (for example, PAP/CHAP) in the access gateway 2 should be additionally mounted.

According to the second preferred embodiment, without belonging to organizations such as companies and without using equipment in companies and the like, for example, various procedures and dealings can be individually carried out for his or her own sake. Further, as with the first preferred embodiment, access line can be unified to only a line from the network service provider. Therefore, this can eliminate the need for the individual user to pay extra communication cost (for example, line laying fee and line charge) for the utilization of various network services. Further, since the access from the individual user to various services is unitarily managed by the group of servers 3, the window of the entry into and withdrawal from various services, billing of charge, and payment of charge is unified. This can reduce cost necessary for the transaction of business on the individual user side. Furthermore, the use of a portable terminal can realize access to various services without substantial limitation on places where access is performed. In addition, the use of the portable telephone and the like as the portable terminal can eliminate the need to separately provide an expensive user terminal 7, and thus can reduce a burden on individual users.

As explained above, in the network system according to the first feature of the invention, packet exchange means is provided so that, in a plurality of IP networks, when an IP packet is sent from a first IP network to a second IP network, the format of the IP packet to be sent from the first IP network to the second IP network is converted to the format of the second IP network, while when the send direction of the IP packet is opposite, the format of the IP packet is converted to the format of the first IP network. By virtue of this construction, even when IP networks different from each other in transmission form are present together, data transmission and data exchange can be carried out without any trouble. Further, the network can be easily expanded or unified.

In the network system according to the second feature of the invention, since access from users to various services is unitarily managed by servers, the window of the entry into and withdrawal from various services, billing of charge, and payment of charge is unified. This can simplify business routine and transaction and can reduce transaction cost on the user side. Further, service providers and online entrepreneurs can outsource the provision of access line and the customer dealing work to the network service provider. Therefore, the cost for acquiring the subscriber of service can be reduced, and can easily expand the service area coverage. In addition, since connection between a plurality of service providers or online entrepreneurs and users is performed through an IP network, the line can be unified.

In the network system according to the third feature of the invention, servers manage, for example, information about services and other information, which users desire, and account information, and alternative account billing from a plurality of service providers or online entrepreneurs is performed. Further, a packet exchange performs conversion of protocol/format from the user terminal side to the service provider or online entrepreneur side and inverse conversion protocol/format from the service provider or online entrepreneur side to the user terminal side. Therefore, access from users to various services, accounting, and alternative execution of account billing can be unitarily managed by servers, and the window of the entry into and withdrawal from various services, billing of charge, and payment of charge is unified. This can simplify business routine and transaction and can reduce transaction cost on the user side. Further, since the packet exchange is connected to a plurality of networks through border gateways, connection between a plurality of service providers or online entrepreneurs and users is performed through only an IP network, the line can be unified. This can facilitate the connection of the user to the service providers or online entrepreneurs.

In the packet data transmission method according to the invention, upon access from a user terminal, only when information about packet data from the user terminal matches access conditions recorded in servers, the packet data is transferred to the packet exchange. This packet exchange converts the packet data from the user side to packet data of protocol and format of the service provider or online entrepreneur as the send destination, and this converted packet data is then transferred to the send destination. On the other hand, packet data from a plurality of service providers or online entrepreneurs is converted to the protocol and format of the user terminal side, and the converted packet data is then sent to the user terminal. Further, the servers record information about account required in the service to the user and perform accounting and execute alternative account billing. Therefore, access from users to various services can be unitarily managed by servers, and, thus, the window of the entry into and withdrawal from various services, billing of charge, payment of charge and the like is unified. This can simplify business routine and transaction and can reduce transaction cost on the user side.

The invention has been described in detail with particular reference to preferred embodiments, but it will be understood that variations and modifications can be effected within the scope of the invention as set forth in the appended claims.

What is claimed is:

1. A network system wherein IP packets according to a service requested by a terminal are sent to one of a plurality of service providers, said network system comprising:
   a plurality of IP networks that each utilize a different network layer protocol, the plurality of IP networks including at least a first IP network, a second IP network, and a third IP network; and
   a packet exchange, provided between the plurality of IP networks, said packet exchange receiving an IP packet in a first network layer protocol format to be sent from the first IP network, determining a destination network among the second IP network and the third IP network based upon a destination address specified by the IP packet in the first network layer protocol format, and converting the IP packet in the first network layer protocol format, wherein the IP packet in the first network layer protocol format is converted to a second network layer protocol format if said second IP network is the destination address that is determined and the IP packet of the first network layer protocol format is converted to a third network layer protocol format if said third IP network is the destination address that is determined.

2. The network system according to claim 1, wherein the user terminal is connected to the first IP network, a first service provider is connected to the second IP network, and a second service provider is connected to the third IP network, wherein said user terminal transmits and receives packets formatted in accordance with said first network layer protocol, said first service provider transmits and receives packets formatted in accordance with said second network layer protocol, and said second service provider transmits and receives packet formatted in accordance with said third network layer protocol.

3. The network system according to claim 2, wherein the first IP network includes a first server which stores service information of services provided by the first service provider and the second service provider.

4. The network system according to claim 2, wherein the first IP network includes a second server which stores account information of the service which has been provided to the terminal.

5. The network system according to claim 3, wherein the first server stores the format of each of the IP networks and the address of the first service provider and the second service provider.

6. The network system according to claim 1, wherein the packet exchange measures the amount of data of the IP packet, which has been converted to one of said second network layer protocol and said third network layer protocol.

7. The network system according to claim 2, wherein the terminal is connected to the first IP network through an access gateway that authenticates the IP packet.

8. A network system comprising:
   a user terminal connected to a first network to be utilized by a user;
   a plurality of networks of service providers or online entrepreneurs which provide various services to the user including at least a second network and a third network, wherein said first network, said second network, and said third network each utilize a different network layer protocol;
   an IP network which transmits packet data between the user terminal and the networks through a router according to an IP address;
   one or more servers connected to the IP network,
   said servers functioning to record information about the user, information about the plurality of service providers or online entrepreneurs, and information about services provided by the networks to the user, and based on the recorded information, to unitarily manage account information of the services provided to the user, and to perform alternative account billing from the service providers or online entrepreneurs to the user; and
   a packet exchange, connected to the IP network, said packet exchange receiving an IP packet in a first network layer protocol format from the user terminal via the first network, determining a destination network among the second network and the third network based upon a destination address specified by the IP packet in the first network layer protocol format, and converting the IP packet in the first network layer protocol format, wherein the IP packet in the first network layer protocol format is converted to a second network layer protocol format if said second network is the destination address that is determined and the IP packet in the first network layer protocol format is converted to a third network layer protocol format if said third network is the destination address that is determined.

9. The network system according to claim 8, wherein the packet exchange performs an inverse format conversion to convert return packets from said second IP network or said third IP network to the first network layer protocol format.

10. The network system according to claim 8, wherein the packet exchange converts the IP packet to said second network layer protocol format using multi-protocol label switching protocol (MPLS) if said second network is determined to be the destination network and converts the IP packet to said third network layer protocol format using IP within IP if said third network is determined to be the destination network.

11. The network system according to claim 8, wherein the user terminal is a personal computer or a portable terminal, capable of processing packet data.

12. A network system comprising:
an IP network through which an IP packet is transmitted;
an access gateway connected to the IP network;
a user terminal which is installed on a user side and is connected to the access gateway by a first network;
a plurality of networks of service providers or online entrepreneurs, including at least a second network and a third network, wherein said first network, said second network and said third network each utilize a different network layer protocol;
one or more servers connected to the IP network that record information about the user and the plurality of service providers or online entrepreneurs, and record information about services provided by the service providers or online entrepreneurs to the user, and based on the recorded information, said one or more servers unitarily manage account information of the services provided to the user;
a packet exchange, connected to the IP network, said packet exchange receiving an IP packet in a first network layer protocol format from the user terminal via the first network, determining a destination network among the second network and the third network based upon a destination address specified by the IP packet in the first network layer protocol format, and converting the IP packet in the first network layer protocol format, wherein the IP packet in the first network layer protocol format is converted to a second network layer protocol format if said second network is the destination address that is determined and the IP packet in the first network layer protocol format is converted to a third network layer protocol format if said third network is the destination address that is determined; and
a plurality of border gateways which connect the packet exchange to the plurality of networks of the service providers or online entrepreneurs.

13. The network system according to claim 12, wherein the user terminal is a personal computer or a portable terminal, capable of processing packet data, and the access gateway is a remote access server.

14. The network system according to claim 13, wherein the portable terminal is a portable telephone connected to the IP network.

15. The network system according to claim 12, wherein the user terminal and the packet exchange are each a router.

16. The network system according to claim 12, wherein the packet exchange is an exchange router.

17. The network system according to claim 12, 15 or 16, wherein the packet exchange converts the received packet to a format corresponding to a network layer protocol of a send destination through encapsulating a format of an original IP packet by multi-protocol label switching protocol (MPLS) or IP within IP as a network layer protocol,
wherein the packet exchange converts the IP packet to said second network layer protocol format using MPLS if said second network is determined to be the destination network and converts the IP packet to said third network layer protocol format using IP within IP if said third network is determined to be the destination network.

18. The network system according to claim 17, wherein the original IP packet comprises an IP (internet protocol) header and payload data,
the packet data encapsulated by MPLS comprises an MPLS label for path designation, an MPLS label for user ID, an IP header and payload data, and
the packet data encapsulated by IP within IP comprises an IP header for encapsulation, an IP header and payload data.

19. A packet data transmission method wherein packet data transmission for receiving/sending services between a user terminal connected to a first network which utilizes a first network protocol and a plurality of service providers or online entrepreneurs is carried out using a plurality of virtual private network (VPN) platforms corresponding to the service providers, which are respectively connected to at least a second network utilizing a second network protocol and a third network utilizing a third network protocol, said packet data transmission method comprising:
recording, in one or more servers, information about one or more users that utilize the user terminal, and information about the service providers or online entrepreneurs;
upon receiving a request from the user for a service, and only when information about the packet data from the user terminal matches access conditions recorded in the servers, determining a destination network among the second network and the third network based upon a destination address specified by an IP packet in a first network layer protocol format, and converting the IP packet in the first network layer protocol format, wherein the IP packet in the first network layer protocol format is converted to a second network layer protocol format if said second network is the destination address that is determined and the IP packet in the first network layer protocol format is converted to a third network layer protocol format if said third network is the destination address that is determined; and
storing and managing account information about the services provided to the user and providing alternative account billing to the user by the servers,
wherein the first network layer protocol utilized by the first network, the second network layer protocol utilized second network, and the third network layer protocol utilized by the third network are different network layer protocols.

20. The packet data transmission method according to claim 19, wherein the conversion of packet data by the packet exchange is carried out using multi-protocol label switching protocol (MPLS) as said second network layer protocol if said second network is determined to be the destination network and IP within IP as said third network layer protocol if said third network is determined to be the destination network, said conversion based on the VPN platform corresponding to the service provider receiving/sending the packet data.

21. The network system according to claim 1, wherein the packet exchange converts the IP packet to said second network layer protocol using multi-protocol label switching protocol (MPLS) if said second IP network is determined to be the destination network or IP within IP if said third IP network is determined to be the destination network.

22. The network system according to claim 1, wherein the packet exchange performs an inverse format conversion to convert return packets from said second IP network or said third IP network to the first network layer protocol.

23. The network system according to claim 12, wherein the packet exchange performs an inverse format conversion to convert return packets from said second network or said third network to the first network layer protocol.

24. The packet data transmission method according to claim 19, further comprising:
performing an inverse format conversion to convert return packets from said second network or said third network to the first network layer protocol.

* * * * *